United States Patent [19]

Elliott et al.

[11] 4,381,082

[45] Apr. 26, 1983

[54] PARTICULATE MATERIAL HANDLING MEANS

[75] Inventors: Donald Elliott, Trainer; Charles A. Gahres, Aston; Dorsey C. Nelson, Springfield, all of Pa.

[73] Assignee: FMC Corporation, Philadelphia, Pa.

[21] Appl. No.: 218,334

[22] Filed: Dec. 19, 1980

[51] Int. Cl.³ .......................................... B02C 13/286
[52] U.S. Cl. .......................... 241/186 A; 241/101 A; 241/189 R
[58] Field of Search ................. 100/145–150, 100/94, 96; 19/80 R, 82; 241/98, 101 A, 101 B, 241/186 A, 280, 281, 277

[56] References Cited

U.S. PATENT DOCUMENTS

| 3,051,398 | 8/1962 | Babb ............................... 241/101 A |
| 3,208,106 | 9/1965 | Leineweber, Jr. et al. . |
| 3,310,086 | 3/1967 | Lasar ................................. 241/98 X |
| 3,897,018 | 7/1975 | Wilkes et al. ....................... 241/223 |
| 4,088,272 | 5/1978 | Grillot ......................... 241/101 A X |
| 4,151,961 | 5/1979 | Makofka et al. ............... 241/101 A |

Primary Examiner—Mark Rosenbaum
Attorney, Agent, or Firm—Charles H. Johnson; Eugene G. Horsky

[57] ABSTRACT

Apparatus for liberating particulate material from a compressed bale and feeding the liberated material at a controlled rate to a processing station comprises a screw conveyor and means for compacting the particulate material against the conveyor screw.

2 Claims, 2 Drawing Figures

PARTICULATE MATERIAL HANDLING MEANS

This invention relates to an apparatus for separating or loosening compressed bales of particulate material and feeding the liberated material at a controlled rate to a place where it may be subjected to any desired manipulation.

Small size particulate material in the form of fibers, flakes etc. is commonly compressed into bale form for ease of transportation from the point of manufacture or harvesting of the material to the place where it is to be processed for ultimate use. Due to the compact nature of the bale, there is sometimes difficulty in removing or liberating the individual particles from the bale, and various forms of apparatus have been devised for accomplishing this. Most commonly, the individual particles are in the form of fibers and one way of liberating the fibers from the bale is by rotating a pronged instrument against one face of the bale to thereby pull individual fibers or small bunches or aggregates of fibers from the bale. One such apparatus is shown in U.S. Pat. No. 3,897,018.

The present invention relates to apparatus for removing or liberating particulate material from a compressed bale and then feeding the liberated particles or aggregates of particles by means of a screw conveyor to any desired processing station, the nature of which is not germain to this invention. Particularly with light weight material a problem arises in feeding the liberating particles into the screw conveyor and accomplishing this is one of the objects of the invention.

Referring now to the drawing.

Figures 1, 2:
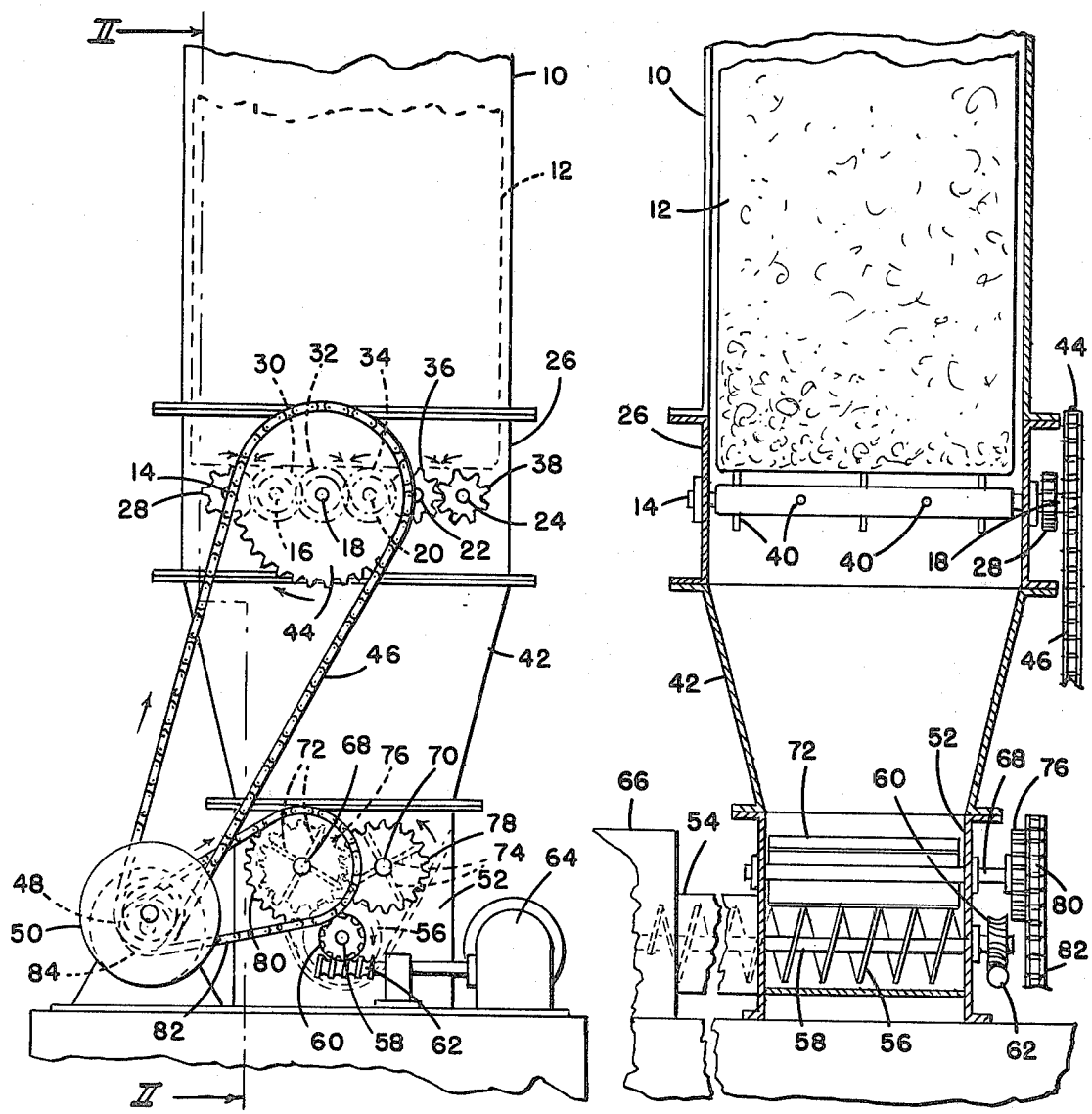
FIG. 1 is a cutaway side elevational view of the apparatus.
FIG. 2 is a sectional view taken along the line II—II of FIG. 1.

The apparatus comprises guide means in the form of a generally vertically extending chute 10 into the open upper end of which a compressed bale 12 of particulate material such as fibers is introduced for gravity movement into engagement with a multiplicity of notable shafts. The chute 10 is dimensioned to closely but slidably confine the bale and the rotatable shafts indicated at 14, 16, 18, 20, 22 and 24 extend across a housing 26 located directly below and aligned with chute 10. The shafts are supported in bearings in opposite walls of housing 26 and are rotatably interconnected by gears 28, 30, 32, 34, 36 and 38 secured respectively to each shaft outside the housing.

The shafts 14, 16, 18, 20, 22 and 24 are all alike and as shown in FIG. 2 for shaft 14, a series of tines or prongs 40 extend generally radially from each shaft. Bale 12 rests on the tines 40 and as the shafts rotate the tines bite into the bale and dig out individual particles or aggregates or small bundles of particles which then drop by gravity into a funnel-like guide section 42. Guide section 42 is not round like a funnel but has four sides which converge toward the lower end so that the liberated particles are concentrated as they approach the bottom of the section. Each of the shafts is provided with vanes extending lengthwise thereof between the prongs which help propel the liberated particles down into guide section 42. Shaft 18 is slightly longer than the others and a sprocket 44 secured to the extended end of shaft 18 is engaged by a drive chain 46 which also engages a sprocket 48 secured to the drive shaft of an electric motor 50. When motor 50 is turned on, the shafts 14, 16, 18, 20, 22 and 24 are driven to cause the tines 40 to disintegrate the bale. While the shafts are shown as six in number, more or fewer may be used depending primarily upon the dimensions of that face of the bale resting thereon.

The lower end of funnel-like section 42 is secured to and supported by a housing 52 in the lower portion of which and extending outwardly through one wall thereof is a screw conveyor comprising a cover member 54 through which extends a rotatably mounted screw 56. The upper portion of cover member 54 within housing 52 is open permitting access of the liberated particulate material to the interior of the screw conveyor. The shaft 58 of screw 56 is provided with a worm wheel 60 engaged by a worm 62 driven by a suitable motor 64. The particulate material entering into engagement with screw 56 is conveyed thereby to a processing apparatus 66 which apparatus per se forms no part of the present invention.

Extending through housing 52 parallel to and above the screw conveyor are a pair of shafts 68 and 70. Shaft 68 is provided within housing 52 with a plurality of longitudinally extending vanes 72 and shaft 70 has a plurality of vanes 74. Shafts 68 and 70 are rotatably mounted in opposite walls of housing 52 and outside the housing are provided with intermeshing gears 76 and 78 respectfully. Shaft 68 also has secured thereto a sprocket wheel 80 engaged by a drive chain 82 which also engages a sprocket 84 driven through a gear reduction from motor 50 or which may be driven by a separate motor, not shown. When drive chain 82 is driven, shafts 68 and 70 are rotated clockwise and counterclockwise respectfully so that the particulate material liberated from the bale and which has fallen into engagement with vanes 72 and 74 is forced downwardly through the open upper portion of screw conveyor cover 54 and compacted loosely in engagement with the screw 56. Without this compacting means comprised of the vanes 72 and 74, light weight particulate material such for example as small fibrous material tends to bridge over the opening in cover 54 and not move down into engagement with screw 56. If bridging does not occur, the screw will force some of the light weight material upwardly through the opening in cover 54 rather than advance it longitudinally to the processing apparatus. Thus, some form of compacting means is necessary to provide proper loading of the screw conveyor so that the particulate material is uniformly fed to the processing apparatus 66.

We claim:

1. Apparatus for liberating particulate material from a bale thereof and feeding same to a processing apparatus comprising guide means for directing a bale into engagement with a plurality of rotatable shafts, said shafts having tines extending generally radially therefrom for engaging the bale and liberating the particulate material therefrom, means for rotating adjacent ones of said shafts in opposite directions, a horizontally extending screw conveyor for feeding the liberated particulate material to a processing apparatus, said screw conveyor comprising a screw rotatable within a cover member, said cover member having an opening in the upper portion therefor for admitting particulate material to enter into engagement with said screw, a guide section for directing the liberated material from the rotatable shafts to the opening in said cover member, compacting means for compacting the particulate material against the screw, said compacting means comprising a pair of counter rotatable shafts extending through said guide section parallel to said screw conveyor, and said shafts having longitudinally extending vanes whereby rotation of said shafts causes said vanes to force the liberated particulate material through the opening in the cover of said screw conveyor and into compact engagement with the screw.

2. The apparatus set forth in claim 1 wherein said guide means, said guide section and the opening in the cover of said screw conveyor are located in vertical alignment.

* * * * *